(12) United States Patent
Esber et al.

(10) Patent No.: US 11,377,156 B2
(45) Date of Patent: Jul. 5, 2022

(54) WHEEL WELL VENT ASSEMBLY

(71) Applicant: Honda Motor Co., Ltd., Tokyo (JP)

(72) Inventors: Patrick G. Esber, Delaware, OH (US);
Christopher D. Hinz, Worthington, OH (US); Shawn L. Tarr, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 326 days.

(21) Appl. No.: 16/743,464

(22) Filed: Jan. 15, 2020

(65) Prior Publication Data
US 2021/0214015 A1    Jul. 15, 2021

(51) Int. Cl.
*B62D 25/18* (2006.01)
*B60K 11/08* (2006.01)

(52) U.S. Cl.
CPC .............. *B62D 25/18* (2013.01); *B60K 11/08* (2013.01)

(58) Field of Classification Search
CPC ................................ B62D 25/18; B60K 11/08
USPC .................................................. 296/198, 208
See application file for complete search history.

(56) References Cited

U.S. PATENT DOCUMENTS

| | | | | |
|---|---|---|---|---|
| 4,549,762 A * | 10/1985 | Burk | ...................... | B60K 11/08 180/68.1 |
| 5,100,177 A * | 3/1992 | Becker | ................. | B62D 25/168 280/851 |
| 6,296,298 B1* | 10/2001 | Barz | ...................... | B62D 21/15 296/187.02 |
| 8,146,987 B2* | 4/2012 | Uchino | ................ | B62D 25/161 296/198 |
| 9,616,731 B2* | 4/2017 | Koberstein | ............ | B60H 1/249 |
| 10,160,308 B2* | 12/2018 | Chae | .......................... | B60T 5/00 |
| 10,518,827 B2* | 12/2019 | Ibañez | .................... | B62D 25/16 |
| 2007/0023238 A1* | 2/2007 | Ramsay | .................... | B60T 5/00 188/4 R |
| 2010/0090503 A1* | 4/2010 | Uchino | ................ | B62D 25/161 296/198 |
| 2012/0071075 A1* | 3/2012 | Wolf | ......................... | B60T 5/00 454/162 |
| 2013/0005232 A1 | 1/2013 | Hoke et al. | | |
| 2016/0016617 A1* | 1/2016 | Wolf | ...................... | B60K 11/04 296/208 |
| 2016/0176450 A1* | 6/2016 | Wolf | ...................... | B62D 35/00 180/68.2 |
| 2019/0176899 A1* | 6/2019 | Miwa | ..................... | B60K 11/04 |

(Continued)

FOREIGN PATENT DOCUMENTS

CN           206749932 U       12/2017
CN           107545985 A        1/2018
(Continued)

*Primary Examiner* — D Glenn Dayoan
*Assistant Examiner* — E Turner Hicks
(74) *Attorney, Agent, or Firm* — Mark Duell; American Honda Motor Co., Inc.

(57) ABSTRACT

A vent assembly in an inner fender assembly disposed between a heat exchanger in an engine compartment and a wheel well of a motor vehicle includes a first vent and a second vent disposed in the inner fender assembly. The first vent includes a plurality of fins disposed at a first angle relative to a horizontal axis. The second vent is disposed between the first vent and the heat exchanger and includes a plurality of fins extending between distal ends of first and second walls of the second vent and disposed at a second angle relative to the horizontal axis.

18 Claims, 5 Drawing Sheets

(56) References Cited

U.S. PATENT DOCUMENTS

2019/0202501 A1* 7/2019 Kishima ................ B62D 35/02
2022/0024246 A1* 1/2022 Smith ................... B60B 7/0026

FOREIGN PATENT DOCUMENTS

| DE | 102015118517 A1 | 5/2017 |
| JP | 3907990 B2 | 4/2003 |
| JP | 2011057172 A | 3/2011 |
| JP | 5994742 B2 | 1/2015 |
| JP | 6225365 B2 | 8/2015 |
| JP | 2016182914 A | 10/2016 |
| WO | 2005070749 A1 | 8/2005 |

* cited by examiner

US 11,377,156 B2

WHEEL WELL VENT ASSEMBLY

TECHNICAL FIELD

The embodiments disclosed herein relate to vents for airflow around a heat exchanger, and more specifically to vents located in a wheel well of a vehicle.

BACKGROUND

A motor vehicle may include a vent located within an inner fender assembly of a wheel well to allow air to pass around and move away from the heat exchanger, which may operate to cool an engine of the motor vehicle. Prior vents, as illustrated in FIG. 1, included fins inadequate to stop both debris thrown by the wheel, which includes a tire disposed in the wheel well, and water splashed from the roadway by the tires from entering into the vent and contacting the heat exchanger. This is because the debris and water may be thrown from different directions. Debris thrown by the wheel may damage or puncture the heat exchanger, and water thrown from the wheel or roadway may cause warping and reduced efficiency of the heat exchanger. Therefore, the need for an improved vent assembly is established that prevents ingress of debris while maintaining airflow around the heat exchanger.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, an inner fender assembly of a motor vehicle defining a wheel well of the motor vehicle separating a front wheel of the motor vehicle rotatable about a lateral axis through the wheel well from an engine of the motor vehicle, and further separating a heat exchanger positioned longitudinally forward of the front wheel in an engine compartment, includes a fender liner, the fender liner further including an opening in a longitudinally forward portion of the fender liner, a first vent disposed in the opening in the fender liner, and a second vent disposed longitudinally forward of the fender liner and between the first vent and the heat exchanger further covering the opening in the fender liner.

According to another aspect, a motor vehicle includes an engine compartment, a heat exchanger disposed in the engine compartment, a wheel rotationally attached to a distal end of an axle extending laterally from the engine compartment, and an inner fender defining a wheel well disposed around the wheel and separating the wheel from the engine compartment. The inner fender includes a fender liner, the fender liner further including an opening in a longitudinally forward portion of the fender liner, a first vent disposed in the opening in the fender liner, and a second vent disposed longitudinally forward of the fender liner and between the first vent and the heat exchanger further covering the opening in the fender liner.

According to yet another aspect, a vent assembly in an inner fender assembly disposed between a heat exchanger in an engine compartment and a wheel well of a motor vehicle includes a first vent disposed in the inner fender. The first vent includes an outer frame, the outer frame having first and second side portions, a top portion, and a bottom portion, and a plurality of fins extending between the first and second side portions, the plurality of fins being disposed at a first angle relative to a horizontal axis. The vent assembly further includes a second vent disposed between the first vent and the heat exchanger that includes an outer frame, the outer frame having first and second side portions, a top portion, and a bottom portion, first and second walls extending orthogonally from inner edges of the first and second side portions of the outer frame, a top wall extending orthogonally from an inner edge of the top portion of the outer frame, and a bottom wall extending orthogonally from an inner edge of the bottom portion of the outer frame, and a plurality of fins extending between distal ends of the first and second walls, the plurality of fins being disposed at a second angle relative to the horizontal axis.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
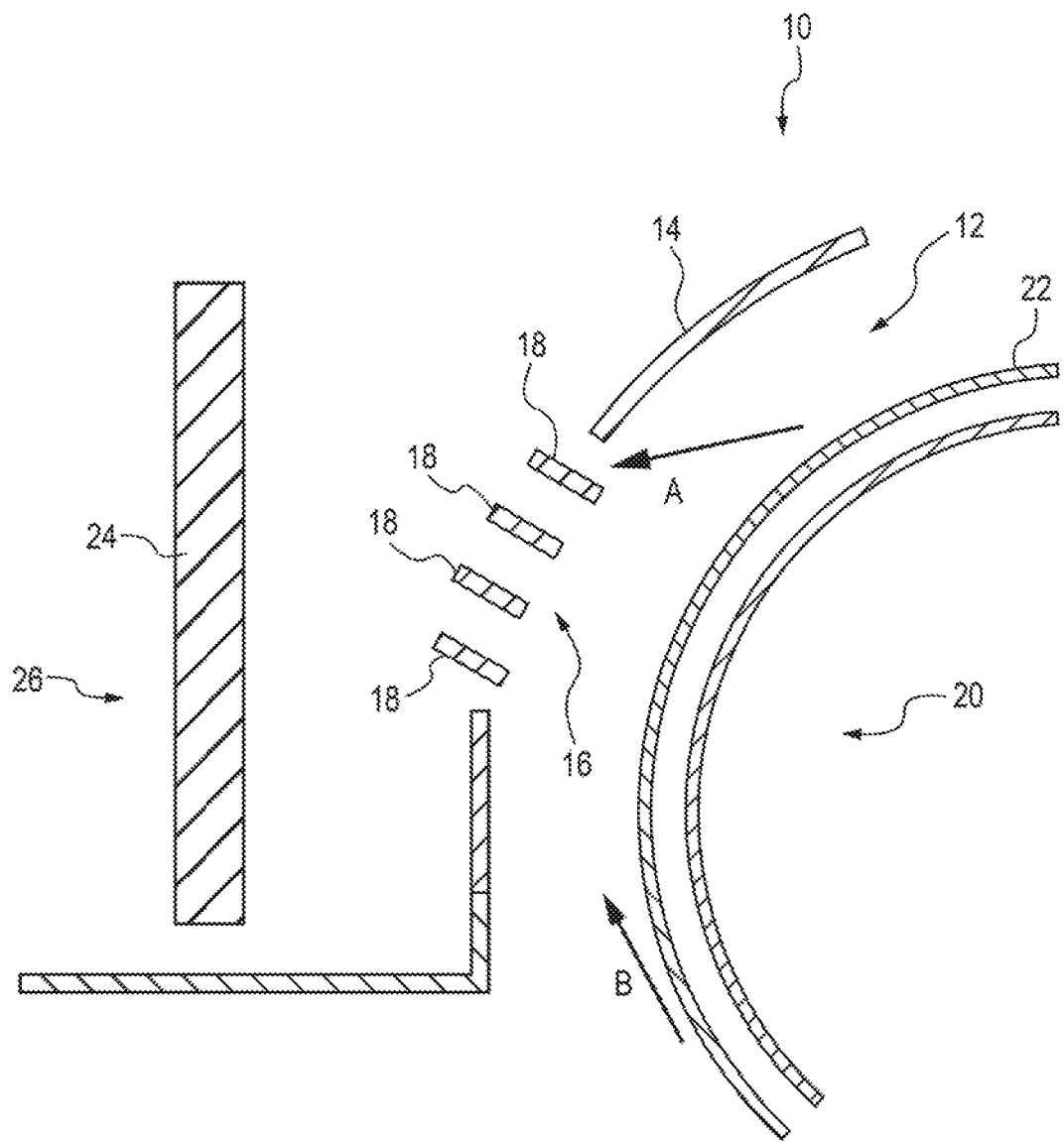
FIG. 1 is schematic side view of a Prior Art vent in a wheel well of a motor vehicle.
Figure 2:
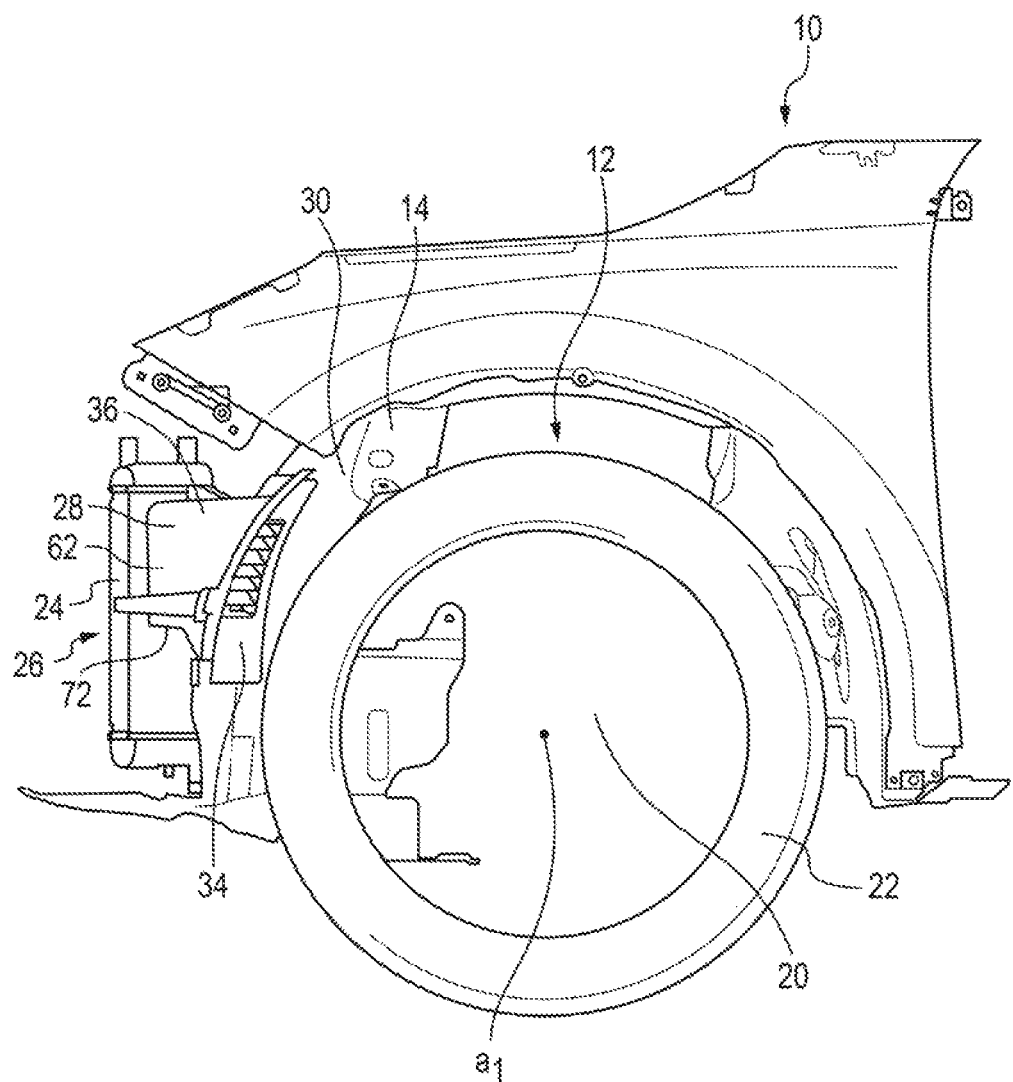
FIG. 2 is a side view of a front quarter of a motor vehicle illustrating a wheel well.
Figure 3:
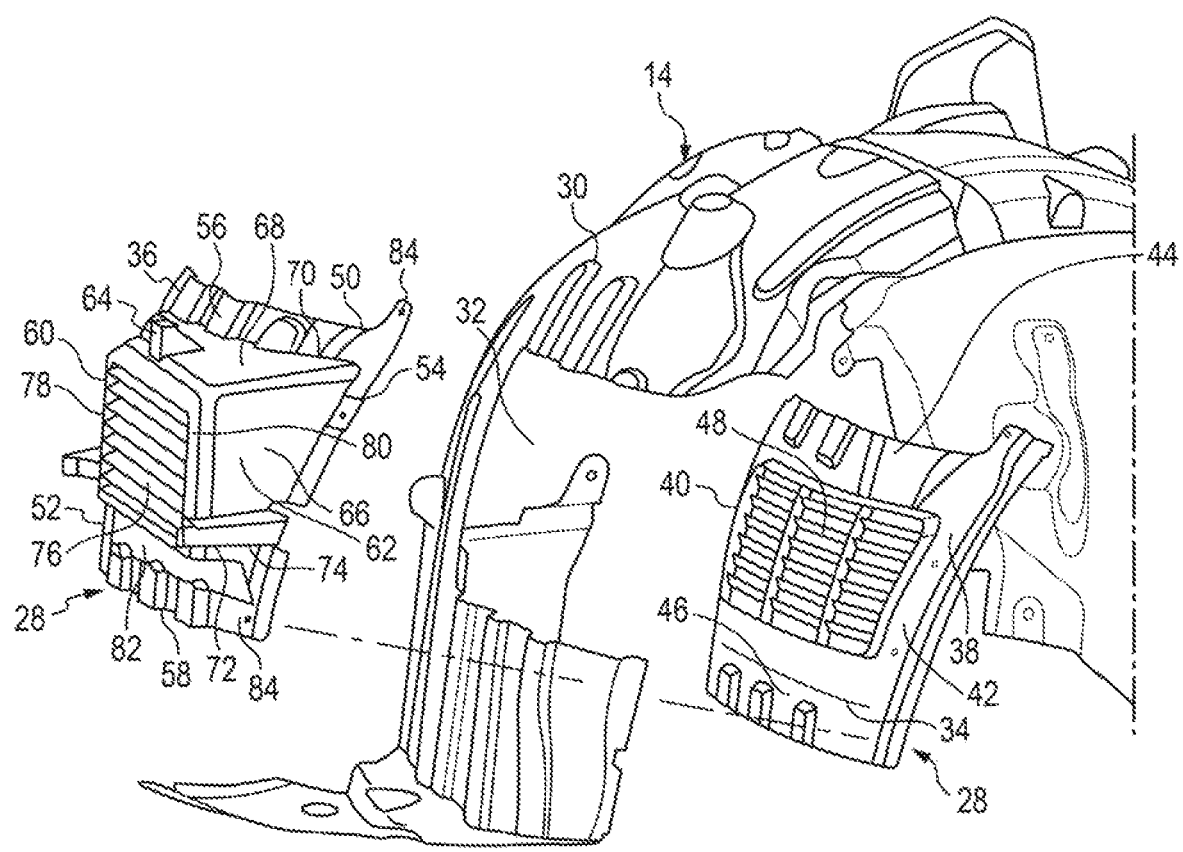
FIG. 3 is an exploded view of an inner fender assembly and vent assembly of the front quarter of the motor vehicle of FIG. 2.

FIG. 1 schematically illustrates a side view of a prior art vent 16 located within an inner fender assembly 14 of a wheel well 12 of a motor vehicle 10. The prior art vent 16, as illustrated in FIG. 1, illustrates that the fins 18 are not able to stop both debris, illustrated by Arrow A, thrown by the wheel 20, which includes a tire 22 disposed in the wheel well 12, and water splashed from the roadway, illustrated by Arrow B, from entering into the prior art vent 16 and contacting the heat exchanger 24 in the engine compartment 26 of the motor vehicle 10. This is because the debris and water may be thrown from different directions. Debris thrown by the wheel 20 may damage or puncture the heat exchanger 24, and water thrown from the wheel 20 may cause warping and reduced efficiency of the heat exchanger 24. Therefore, the need for an improved vent assembly 28, illustrated in FIGS. 2-5, is established.

FIGS. 2-5 illustrate a side view of the front quarter of a motor vehicle 10 with an inner fender assembly 14. The inner fender assembly 14 defines a wheel well 12 of the motor vehicle 10 separating a front wheel 20 of the motor vehicle 10 that is rotatable about a lateral axis a1 through the wheel well 12 from an engine (not shown) of the motor vehicle 10, and the inner fender assembly 14 further separates the heat exchanger 24 positioned longitudinally forward of the front wheel 20 in an engine compartment 26.

The inner fender assembly 14 still further includes a fender liner 30 that defines the body of the wheel well 12. The fender liner 30 includes an opening 32 in a longitudinally forward portion of the fender liner 30 into which the vent assembly 28 is disposed.

The vent assembly 28 includes a first vent 34 disposed in the opening 32 in the fender liner 30 and a second vent 36 disposed longitudinally forward of the fender liner 30 and between the first vent 34 and the heat exchanger 24 further covering the opening 32 in the fender liner 30.

The first vent 34 includes a first outer frame 38 having first and second side portions 40, 42, a top portion 44, a bottom portion 46, and a plurality of fins 48 extending between the first and second side portions 40, 42. The plurality of fins are 48 are disposed at a first angle $\alpha_1$ relative to a horizontal axis an.

The second vent 36 includes a second outer frame 50 having first and second side portions 52, 54, a top portion 56, and a bottom portion 58. First and second walls 60, 62 extend orthogonally from inner edges 64, 66 of the first and second side portions 52, 54 of the second outer frame 50, a top wall 68 extending orthogonally from an inner edge 70 of the top portion 56 of the second outer frame 50, and a bottom wall 72 extending orthogonally from an inner edge 74 of the bottom portion 58 of the second outer frame 50. A plurality of fins 76 extend between distal ends 78, 80 of the first and second walls 60, 62. The plurality of fins 76 are disposed at a second angle $\alpha_2$ relative to the horizontal axis $a_h$.

Figure 4:
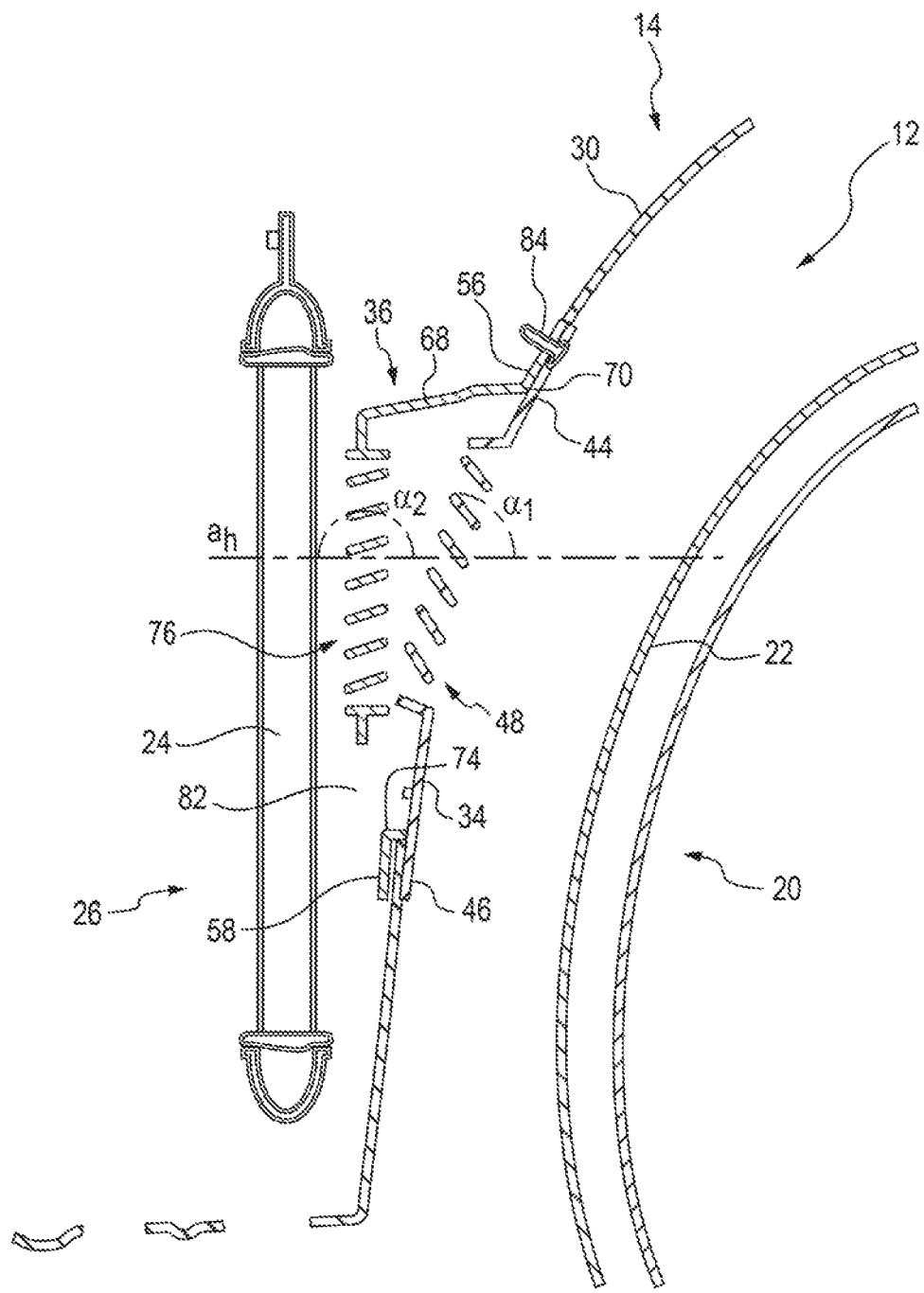
FIG. 4 is a schematic of a cross section of the inner fender assembly and vent assembly of FIG. 3.
Figure 5:
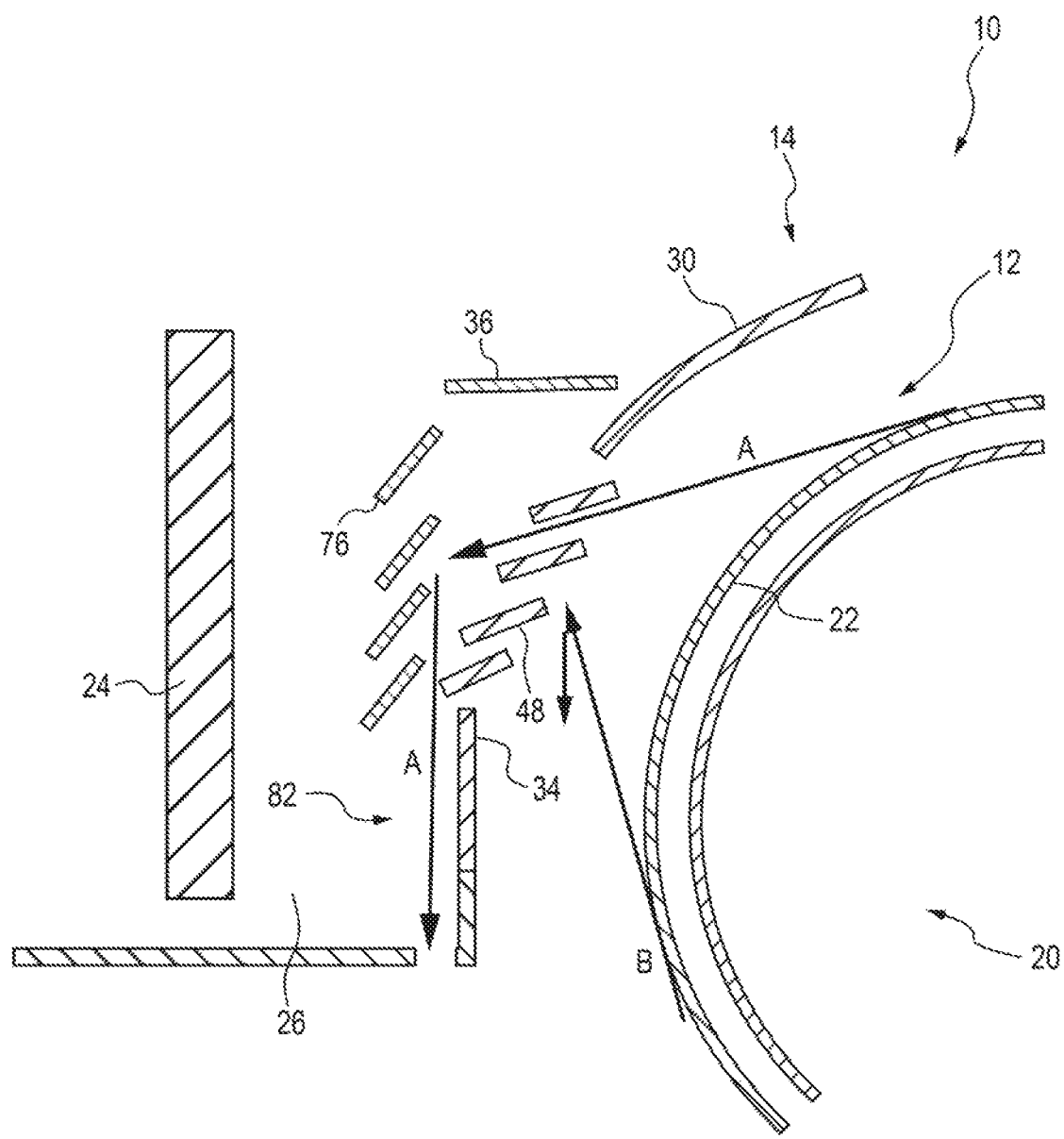
FIG. 5 is a schematic of the cross section of the inner fender assembly and vent assembly of FIG. 4 illustrating the flow of water and debris in an around the vent assembly.

For effective operation of the vent assembly 28, as illustrated in FIGS. 4 and 5, the first angle $\alpha_1$ and second angle $\alpha_2$ are, at the very least, not equal, and may further be angled in different directions from the horizontal axis an (i.e. angles with differences greater than 90°). Some water and debris is deflected by the fins 48 of the first vent 34 (Arrow B in FIG. 5). Any water or debris that is angled to pass the fins 48 of the first vent 34 (Arrow A in FIG. 5) is stopped by the separately angled and oriented fins 76 of the second vent 36. The arrangement of the fins 48, 76 prevents water and debris from entering the vent assembly 28 from the wheel well 12 and contacting the heat exchanger 24. However, the arrangement of the fins 48, 76 has no impact on the movement of air over heat exchanger 24 and out the vent assembly 28 for ventilation into the wheel well 12.

The vent assembly 28 may be arranged to further include a drainage hole 82 disposed in the bottom wall 72 extending orthogonally from the inner edge 74 of the bottom portion 58 of the second outer frame 50. The drainage hole 82 allows for water or debris that is able to pass the fins 48 of the first vent 34, but which is nonetheless stopped by the separately angled and oriented fins 76 of the second vent 36, to drain from the vent assembly 28 (as illustrated in FIG. 5).

The second vent 36 and the first vent 34 may be constructed of any suitable materials, including, but not limited, to injection molded plastics or thermoplastics, aluminum, steel, composites, and the like. The vent assembly 28 may be constructed of a single piece, or the vent assembly 28 may be constructed of separate second vent 36 and first vent 34 attached together and to the inner fender assembly 14 by a plurality of any suitable fasteners 84. In one embodiment, the fasteners 84 are rivets.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. An inner fender assembly of a motor vehicle, the inner fender assembly defining a wheel well of the motor vehicle separating a front wheel of the motor vehicle rotatable about a lateral axis through the wheel well from an engine of the motor vehicle, and the inner fender assembly further separating a heat exchanger positioned longitudinally forward of the front wheel in an engine compartment, comprising:
   a fender liner, the fender liner further including an opening in a longitudinally forward portion of the fender liner;
   a first vent disposed in the opening in the fender liner, wherein the first vent comprises:
      an outer frame, the outer frame having first and second side portions, a top portion, and a bottom portion; and
      a plurality of fins extending between the first and second side portions, the plurality of fins being disposed at a first angle relative to a horizontal axis; and
   a second vent disposed longitudinally forward of the fender liner and between the first vent and the heat exchanger further covering the opening in the fender liner.

2. The inner fender assembly of claim 1 wherein the second vent comprises:
   an outer frame, the outer frame having first and second side portions, a top portion, and a bottom portion;
   first and second walls extending orthogonally from inner edges of the first and second side portions of the outer frame, a top wall extending orthogonally from an inner edge of the top portion of the outer frame, and a bottom wall extending orthogonally from an inner edge of the bottom portion of the outer frame; and
   a plurality of fins extending between distal ends of the first and second walls, the plurality of fins being disposed at a second angle relative to the horizontal axis.

3. The inner fender assembly of claim 2 wherein the first angle and second angle are not equal.

4. The inner fender assembly of claim 3 wherein the bottom wall extending orthogonally from an inner edge of the bottom portion of the outer frame further comprises a drainage hole.

5. The inner fender assembly of claim 4 wherein the second vent and the first vent are attached by a plurality of fasteners.

6. The inner fender assembly of claim 5 wherein the fasteners are rivets.

7. The inner fender assembly of claim 6 wherein the first vent and second vent are injection molded.

8. A motor vehicle, comprising:
   an engine compartment;

a heat exchanger disposed in the engine compartment;

a wheel rotationally attached to a distal end of an axle extending laterally from the engine compartment; and an inner fender defining a wheel well disposed around the wheel and separating the wheel from the engine compartment, comprising:

a fender liner, the fender liner further including an opening in a longitudinally forward portion of the fender liner;

a first vent disposed in the opening in the fender liner, wherein the first vent comprises:

an outer frame, the outer frame having first and second side portions, a top portion, and a bottom portion; and a plurality of fins extending between the first and second side portions, the plurality of fins being disposed at a first angle relative to a horizontal axis; and a second vent disposed longitudinally forward of the fender liner and between the first vent and the heat exchanger further covering the opening in the fender liner.

9. The inner fender assembly of claim 8 wherein the second vent comprises:

an outer frame, the outer frame having first and second side portions, a top portion, and a bottom portion;

first and second walls extending orthogonally from inner edges of the first and second side portions of the outer frame, a top wall extending orthogonally from an inner edge of the top portion of the outer frame, and a bottom wall extending orthogonally from an inner edge of the bottom portion of the outer frame; and a plurality of fins extending between distal ends of the first and second walls, the plurality of fins being disposed at a second angle relative to the horizontal axis.

10. The inner fender assembly of claim 9 wherein the first angle and second angle are not equal.

11. The inner fender assembly of claim 10 wherein the bottom wall extending orthogonally from an inner edge of the bottom portion of the outer frame further comprises a drainage hole.

12. The inner fender assembly of claim 11 wherein the second vent and the first vent are attached by a plurality of fasteners.

13. The inner fender assembly of claim 12 wherein the fasteners are rivets.

14. The inner fender assembly of claim 13 wherein the first vent and second vent are injection molded.

15. A vent assembly in an inner fender assembly disposed between a heat exchanger in an engine compartment and a wheel well of a motor vehicle, comprising:

a first vent disposed in the inner fender, comprising:

an outer frame, the outer frame having first and second side portions, a top portion, and a bottom portion; and a plurality of fins extending between the first and second side portions, the plurality of fins being disposed at a first angle relative to a horizontal axis; and a second vent disposed between the first vent and the heat exchanger, comprising:

an outer frame, the outer frame having first and second side portions, a top portion, and a bottom portion;

first and second walls extending orthogonally from inner edges of the first and second side portions of the outer frame, a top wall extending orthogonally from an inner edge of the top portion of the outer frame, and a bottom wall extending orthogonally from an inner edge of the bottom portion of the outer frame; and a plurality of fins extending between distal ends of the first and second walls, the plurality of fins being disposed at a second angle relative to the horizontal axis.

16. The vent assembly of claim 15 wherein the first angle and second angle are not equal.

17. The vent assembly of claim 16 wherein the bottom wall extending orthogonally from an inner edge of the bottom portion of the outer frame further comprises a drainage hole.

18. The inner fender assembly of claim 17 wherein the second vent and the first vent are attached by a plurality of fasteners.

\* \* \* \* \*